June 23, 1931.  R. A. GLASER  1,811,123
COPYHOLDER FOR PROJECTION APPARATUS
Filed Oct. 31, 1927
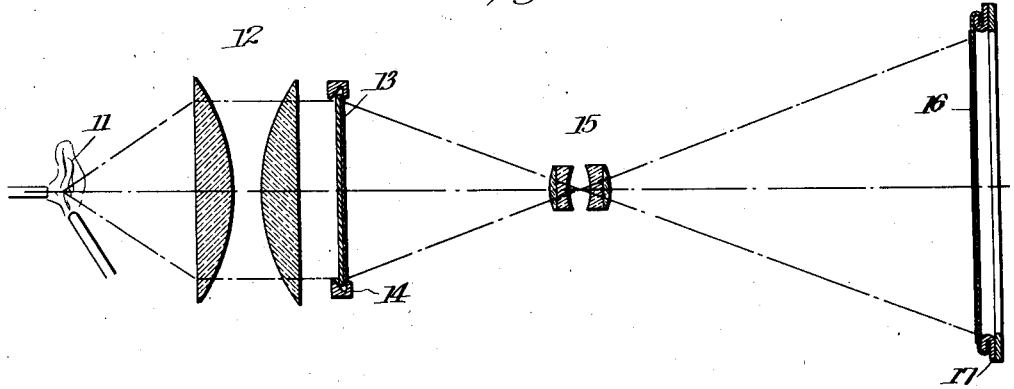
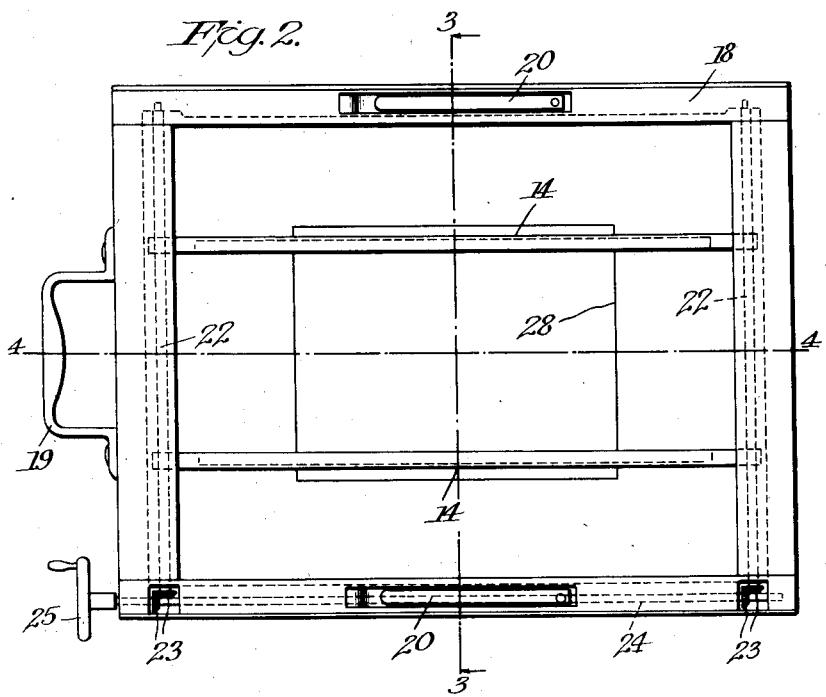
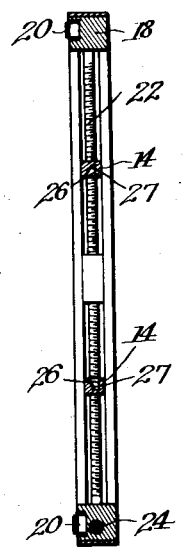
Inventor
R. A. Glaser
By Emery, Booth, Janney & Varney
his Attorneys Patented June 23, 1931

1,811,123

UNITED STATES PATENT OFFICE

RUDOLPH A. GLASER, OF CLEVELAND, OHIO, ASSIGNOR, BY MESNE ASSIGNMENTS, TO GARDNER ABBOTT, AS TRUSTEE

COPYHOLDER FOR PROJECTION APPARATUS

Application filed October 31, 1927. Serial No. 230,133.

My invention comprises an improved negative or positive frame for properly positioning successive negatives or positives for the purpose of projecting sets of color separation negative or positive images, preferably mounted on glass, or any negative or positive mounted upon a transparent surface, to a sensitized stone or metal printing plate, and has among other objects the following:

First, to produce an enlarged or reduced or same size image without any distortion;

Second, to speed up production of color plates in the printing and lithographing arts;

Third, to produce exact register when projecting more than one negative or positive for a given subject,—as for instance on a color reproduction where two or more negatives or positives are used in making the necessary number of printing plates;

Fourth, to eliminate the effect of vibration upon the image projected.

Further objects and advantages of the invention appear in connection with the following description of the illustrative embodiment shown in the drawings, wherein Fig. 1 is a diagram showing the general arrangement of the projecting apparatus;

Fig. 2 is a side view of a preferred form of negative or positive holder; and

Figs. 3 and 4 are cross-sections of the latter on the lines 3—3 and 4—4, respectively in Fig. 2.

Referring to Fig. 1, the apparatus to which the invention pertains comprises a suitable source of light 11, a condensing lens or lenses 12 for throwing a beam of light having parallel rays through the negative 13 in the holder 14, whereby the image of the negative is projected by the lens 15 either directly or through a suitable screen, on to the sensitized surface of the plate or transfer sheet 16 mounted in the holder 17. The lenses, negative or positive, and plate are mounted in a suitable camera and protected from all light other than that from the high intensity arc 11.

The negative or positive holder frame illustrated in the drawings is particularly adapted for the purposes of the invention, and comprises a frame 18 adapted to be inserted by the handle 19 into the camera, as is usual in projecting apparatus. Springs 20 hold the frame tightly against the wall of the camera groove next to the projecting lens 15. The bars 14 that hold the negative or positive 13 are mounted at their ends in grooves 21 in the end frame members and are moved towards and away from each other by means of right and left screws on two rods 22 that are journaled in the grooves 21 and threaded through screw threaded holes in the ends of the bars, arranged for simultaneous rotation by means of bevel gears 23 on a lengthwise disposed actuating rod 24 equipped with a handle 25 at the end of the frame accessible to the operator.

The pinion screws are threaded so that the upper negative or positive holder will work opposite to that of the lower negative or positive holder, or when the adjusting handle is turned to the right the upper negative or positive holder will move downward while the lower negative or positive holder will move upward holding the negative or positive rigid in predetermined position with respect to the frame, and when the adjusting handle is turned to the left the upper negative or positive holder will move upward and the lower negative or positive holder will move downward thereby quickly releasing the negative or positive.

The bars 14 are provided with rabbets or shallow grooves each having a vertical wall 26 and an inclined wall 27 for engaging the edges of the negative or positive and clamping it. Thus negatives or positives of slightly different thickness may be accommodated. The vertical groove is disposed on the side toward the projection lens 15, and the coated film or image side of the negative or positive is placed against it, so that irrespective of the thickness of the glass, the image will always be spaced at the same distance from the lens 15.

A mask 28 of sheet brass or other opaque material is mounted across the frame in any convenient way for screening the negative or positive. Masks having openings of sizes to fit the negatives or positives for which the apparatus is to be used are provided for use interchangeably.

Advantages of the invention are as follows:

The negative or positive frame is cast of metal and can be built to fit any camera in which glass photo negatives or positives, or any film mounted upon glass or transparent substance, are used. The negative or positive frame is mounted to allow for the operation of the main pinion gear rod, pinion screws and pinion gears which are operated by the adjusting handle, without removing it from the camera.

The negative or positive holders are grooved to hold a negative or positive of any thickness of glass in use, but can be grooved to fit a negative or positive of thicker glass. The film side of the negative or positive is always at the same distance from the lens notwithstanding the variation of the thickness in glass which carries the film, and therefore the successive images, whether they are enlarged or reduced, are reproduced all exactly the same size.

The negative or positive frame is inserted into the regular space of the camera and moves with the camera and the plate holder, the negative or positive holder bars when clamped by the adjusting handle are tight upon and move with the threads of the pinion screws, and the pinion screws turn snugly in the negative or positive frame; therefore the only vibrations effecting the negative or positive holders are those effecting the negative or positive frame and plate holder in like manner, while in the projection apparatus heretofore in practical use the negative or positive was subject to non-synchronized or reverse vibrations causing distortion and a loss of register when two or more negatives or positives were used to produce a set of color printing plates.

The tension springs at top and bottom of the frame hold the negative or positive frame rigid in proper spaced relation with the lens 15 when the frame is inserted in the opening of the camera, thus dispensing with the need for hand focusing when changing negatives or positives.

The top and bottom frame or runner plates are accurately made from a smooth light metal, and cover the inside mechanism and operate as a convenient slide when inserting or extracting the negative or positive frame from its camera opening.

It is evident that the invention may be applied to plate or copy holders for other purposes than enlarging, and its use is not restricted to photographic projecting apparatus.

I claim the following as my invention:

1. An improved negative or positive holder-frame for projecting cameras adapted to be inserted in a suitable groove in the camera, comprising a frame, means supported by said frame for clamping the negative or positive and automatically positioning the image carrying surface thereof in a predetermined plane with respect to the front face of said holder-frame, and means carried by said frame to automatically position the holder-frame in the camera groove with its front face in a predetermined plane with respect to the camera lens, whereby a plurality of separation images may be successively projected with assurance that the projections of corresponding elements of the images will coincide with precision.

2. In an improved negative or positive holder frame for projecting cameras adapted to be inserted in a suitable groove in the camera, a frame, means supported by said frame for clamping the negative or positive and automatically positioning the image carrying surface thereof in a predetermined plane with respect to a face of said holder-frame, and means carried by said frame to automatically position the holder-frame in the camera groove with said face in a predetermined plane with respect to the camera lens, whereby a plurality of separation images may be successively projected with assurance that the projections of corresponding elements of the images will coincide with precision.

3. In a combination for precise positioning of negative or positive images for projecting cameras, a frame adapted to be inserted in a suitable groove in the camera, means supported by said frame for clamping the negative or positive and automatically positioning the image carrying surface thereof in a predetermined plane with respect to said frame, and means cooperating with said frame to automatically position the frame in the camera groove with said plane in a predetermined position with respect to the camera lens, whereby a plurality of separation images may be successively projected with assurance that the projections of corresponding elements of the images will coincide with precision.

In testimony whereof, I have signed my name to this specification.

RUDOLPH A. GLASER.